United States Patent
Schulze et al.

[15] 3,691,135
[45] Sept. 12, 1972

[54] RAPID DRYING MOISTURE CURED COATINGS

[72] Inventors: Heinz Schulze, 6408 Wilbur Drive, Austin, Tex. 78757; Michael Cuscurida, 301 E. 34 St., Austin, Tex. 78705

[22] Filed: Sept. 28, 1970

[21] Appl. No.: 76,329

[52] U.S. Cl....260/77.5 AP, 117/128.4, 117/161 KP, 260/31.2 N, 260/31.4 R, 260/32.8 N, 260/33.6 UB, 260/77.5 AB, 260/77.5 AC, 260/635 R
[51] Int. Cl. ............................................C08g 22/16
[58] Field of Search ................260/77.5 AP, 77.5 CR

[56] References Cited

UNITED STATES PATENTS

| | | |
|---|---|---|
| 3,533,972 | 10/1970 | Pawlak et al. ......260/77.5 AP |
| 3,557,249 | 1/1971 | Dannels et al. ......260/77.5 AP |
| 3,054,803 | 9/1962 | Robeson et al. .....260/77.5 AP |

FOREIGN PATENTS OR APPLICATIONS

| | | |
|---|---|---|
| 580,469 | 9/1946 | Great Britain |
| 842,075 | 6/1952 | Germany |

OTHER PUBLICATIONS

Head, " J. Chem. Soc.," 1955, pp. 1036– 1037
Raudnitz, " Chem. & Ind.," 1956, p. 166
Rodd (ED.)," Chemistry of Carbon Compounds," IA, Elsevier, N.Y., 1951, p. 715

*Primary Examiner*—Donald E. Czaja
*Assistant Examiner*—M. J. Welsh
*Attorney*—John R. Kirk, Jr., H. G. Jackson and Terrence D. Dreyer

[57] ABSTRACT

Fast drying (curing) polyurethane coatings with excellent physical properties may be made from an isocyanate, a polyhydric alcohol and a polyol which is a condensation product of glyoxal and a polyhydric alcohol which may also contain monofunctional alcohols and residues of vinyl carboxylic acids. Such coatings cure both by reaction with air and moisture. Polyurethane coatings are useful anywhere a tough covering is required. For example, the coatings are useful in flooring, roofing, and wire covering.

10 Claims, No Drawings

RAPID DRYING MOISTURE CURED COATINGS

BACKGROUND OF THE INVENTION

1. Field of the Invention

This invention pertains to the field of polyurethane coatings.

2. Description of the Prior Art

Moisture cured urethane coatings are well known in the art. A comprehensive discussion of prior art moisture cured coatings may be found in Saunders, J. H. and Frisch, K. C., *Polyurethanes: Chemistry and Technology, Part II Technology*, Interscience, New York, 1964. In general, prior art moisture cured coatings are made by reacting a conventional polyol with an excess of isocyanate, applying this liquid to a surface, and allowing the resultant coating to cure in the open air by reaction of the excess of isocyanate groups with moisture in the air. The conventional polyols are most often simply polyhydric alcohols. Diols such as 1,3 butane diol 1,5 pentane diols, and polypropylene glycols of various molecular weights are commonly used. Triols such as trimethylolpropane, glycerine, and alkylene oxide adducts of the above are also used in prior art moisture cured coatings. Although acceptable coatings may be obtained using these conventional polyhydric alcohols as polyols, there are disadvantages. The principle disadvantage connected with prior art coating is excessive cure or drying time. It is a definite advantage to have a coating which will cure rapidly. As the liquid coating is applied it begins the process of reacting with moisture in the air and becomes more viscous until it hardens and loses any sticky (tacky) quality. Rapid curing means rapid hardening and aids in the minimization of dust collection on the coating, eases processing problems by decreasing the cycle time and prevents excessive running on inclined surfaces. The hardness of prior art coatings could be adjusted by varying the molecular weight and functionality of the conventional polyol or polyols used. In general the lower the molecular weight and the higher the average functionality of the polyols, the harder the finished coating. However, increased hardness most often resulted in increased brittleness of the coating. This lack of flexibility resulted in cracking under heavy use.

It has been surprisingly discovered that the use of the new polyols of this invention in coating formulations also containing conventional polyols imparts rapid curing without detracting from other desirable properties of the coatings. The new polyols enable the coatings to cure both by reaction with moisture and air.

Also, by using the polyols of this invention in addition to conventional polyols in a coating formulation a very hard coating may be made which remains flexible.

The preparation of condensation products of glyoxal and triols is disclosed in German Pat. No. 842,075. The use of these materials as polyols in polyurethane coatings is not disclosed in the prior art.

SUMMARY OF THE INVENTION

This invention is a new class of polyurethane moisture cured coatings which may be made by the reaction of an excess of polyisocyanates with hydroxy-containing materials which reaction product is then applied in a thin film or coating and allowed to cure by the reaction with air and moisture in the air. The invention is also a method for making the coatings. The invention is also a portion of the hydroxy containing materials (polyols) employed in the coatings. These are made by the reaction of glyoxal and a polyhydric alcohol in such proportion that the resultant polyol has at least two hydroxyl groups available for the urethane reaction; the reaction of glyoxal and a polyhydric alcohol and a monofunctional allylic alcohol in such proportion that the resultant polyol has at least an average of 0.5 hydroxyl groups available for the urethane reaction; or the reaction of glyoxal and a polyhydric alcohol and a monofunctional vinyl carboxylic acid in such proportion that the resultant polyol has at least an average of 0.5 hydroxyl groups available for the urethane reaction. The remaining hydroxy containing materials necessary for the coating formulations are conventional polyols.

DESCRIPTION OF THE PREFERRED EMBODIMENTS

The polyols of our invention include the reaction product of glyoxal and a polyhydric alcohol; the reaction product of glyoxal and a polyhydric alcohol and a monofunctional allylic alcohol; and the reaction product of glyoxal and a polyhydric alcohol and a monofunctional vinyl carboxylic acid.

Examples of polyfunctional alcohols useful in the process of our invention include, for example, glycerine, trimethylolpropane, 1,2,6 hexanetriol, polypropylene glycols of various molecular weights and alkylene oxide adducts of polyfunctional alcohols. Any polyfunctional alcohol which will react with glyoxal is within the scope of our invention.

The monofunctional alcohols which may be reacted with the glyoxal and polyfunctional alcohols are preferably those containing an allylic group. The allylic group aids in the rapid curing properties of the process of our invention. Examples of such monofunctional alcohols are allyl alcohol, crotyl alcohol or higher allylic alcohols as for instance those obtained by allylic halogenation and subsequent hydrolysis of olefins. Likewise, the vinyl carboxylic acids which may be reacted with the glyoxal and polyfunctional alcohols are preferably those containing an unsaturated group. Examples of such acids are acrylic, methacrylic and crotonic acid.

In addition to the polyols of the invention, conventional polyols are also a necessary ingredient in the coatings of the invention. These conventional polyols are most often simply polyhydric alcohols. Diols such as 1,3 butane diol, 1,5 pentane diol, and polypropylene glycols of various molecular weights are examples of commonly used conventional polyols. Further examples of conventional polyols are triols such as trimethylolpropane, glycerine, and alkylene oxide adducts of the above.

In order to form polyurethane coatings using the conventional polyols and the polyols of the invention prepared as above described, another ingredient is essential: an isocyanate. An isocyanate reacts directly with the active hydrogens of the polyols. The isocyanate may be aliphatic or aromatic. The isocyanate may be difunctional such as toluene diisocyanate or a polyfunctional polyaryl isocyanate, as produced by the phosgenation of the reaction product of aniline and formaldehyde. Such reactions are well known and described in U.S. Pat. Nos. 2,683,730, 3,277,173, 3,344,162 and 3,362,979, for example. The polyaryl isocyanates thus formed have functionalities greater than two which can be varied up to the higher functional materials. In practice, however, functionalities greater than four are attained only with difficulty. However, for purposes of practice of my invention, materials with a functionality as high as five may be used. It is preferred that the functionality be from two to about four, and especially preferred that the functionality of the polyaryl isocyanate used in the practice of my invention be from about 2.3 to about 3.5.

The especially preferred isocyanate for use in the process of our invention is toluene diisocyanate.

Although coatings may be prepared without using catalysts, it is sometimes desirable to use either a tertiary amine or an organic metal salt in the formulation to catalyze the reaction between the free isocyanate groups and the moisture in the air.

Many useful catalyst materials for the urethane reaction are well known and may be employed in the practice of the invention. Examples of suitable tertiary amines, used either individually or in mixture, are the N-alkylmorpholines, N-alkylalkanolamines, N,N-dialkylcyclohexylamines and alkylamines where the alkyl groups are methyl, ethyl, propyl, butyl, etc. Also triethylenediamine, tetramethylethylenediamine, triethylamine, tripropylamine, tributylamine, triamylamine, pyridine, quiniline, dimethylpiperazine, dimethylhexylhexahydroaniline, piperazine, N-ethylmorpholine, 2-methylpiperazine, dimethylaniline and nicotine, for example, are useful urethane catalysts. Also, useful catalyst are organo-metallic compounds including those of bismuth, lead, tin, titanium, iron, antimony, uranium, cadmium, cobalt, thorium, aluminum, mercury, zinc, nickel, serium, molybdenum, vanadium, copper, manganese, zirconium, etc. Some examples of these metal catalysts included bismuth nitrate, lead 2-ethylhexoate, lead benzoate, lead oleate, tributyltin, butyltin trichlorite, stannic chloride, stannous octoate, stannous oleate, ferric chloride, antimony trichloride, antimony glycolate, tin glycolates, etc. Selection of the individual catalysts and proportions to use in the polyurethane reaction are well within the knowledge of those skilled in the art, and an amine and organo metallic compound are often used together in the polyurethane reaction.

A solvent must also be used in the coating before it is applied to aid in application, viscosity adjustment or storage stability. The solvent should be inert to the reaction of the glyoxal with the alcohols and carboxylic acids, inert to the reaction of the isocyanates with hydroxyl groups and inert to the isocyanate groups. Examples of suitable solvents are xylene, 2-ethoxyethylacetate, ethyl benzene, toluene, mineral spirits, ethyl acetate, cyclohexanone, methyl ethyl ketone, and amyl acetate.

The following examples will illustrate the preparation of glyoxal-polyol condensation products and their application and usefulness in polyurethane coatings.

EXAMPLE 1

This example will illustrate the preparation of a glycerine-glyoxal condensate.

A mixture of glycerine (920 g., 10 moles), 40 percent glyoxal (725 g., 5.0 moles), (50 g.) of an acid ion-exchange resin, and toluene (500 ml.) was subjected to an azeotropic distillation until 64 g. of an aqueous phase were separated. After cooling, the toluene phase was decanted and the residue diluted with dioxane (500 ml.). It was then filtered warm and stripped at 120° C./0.1 mm. The light brown, viscous residue (957 g.) had a hydroxyl number of 483 and a number average molecular weight of 270.

EXAMPLE 2

This example will illustrate the preparation of a glycerine-glyoxal-allyl alcohol condensate.

A mixture of glycerine (460 g., 5 moles), 40 percent glyoxal (725 g., 5.0 moles), allyl alcohol (1,400 ml., 20.6 moles), benzene (1,400 ml.), and an acid ion-exchange resin (50 g.) was heated under reflux (72°–84° C.) for 16 hours. An aqueous phase (749 g. containing 14.8 percent allyl alcohol) was separated by azeotropic distillation through a 50 mm. packed column.

The reaction mixture was filtered and stripped at 100° C. under aspirator vacuum, refiltered and finally dried at 35° C./0.1 mm. The pale yellow reaction product was of low viscosity and was water insoluble. It had a hydroxyl number of 164, iodine number of 190, and a number average molecular weight of 266.

EXAMPLE 3

This example will illustrate the preparation of a 1,2,6-hexanetriol-glyoxal-allyl alcohol condensate.

A mixture of 1,2,6-hexanetriol (420 g., 3 moles), 40 percent glyoxal (402 g., 3 moles), allyl alcohol (696 g., 11.2 moles), benzene (600 ml.), and an acid ion exchange resin was heated to boiling and the aqueous layer removed. When water formation ceased, benzene and excess allyl alcohol were removed to a pot temperature of 87° C. The mixture was then heated to 125° C. under aspirator vacuum and then under full vacuum to a pot temperature of 100° C. The product weighed 695 g. and had a hydroxyl number of 218.

EXAMPLE 4

This example illustrates the superior coating formulation using the polyols of our invention along with conventional polyols in coating formulations. The propylene oxide adduct of glycerine, the polypropylene glycol and trimethylolpropane are conventional polyols. The glyoxal containing materials are polyols of the invention. The dibutyltin dilaurate is a catalyst. The xylene and 2-ethoxyethyl acetate are solvents. The di-t-butyl p-cresol is an oxidation inhibitor.

Run A, B, and C are coatings made with the polyols of our invention as part of the formulation. Run D is a typical prior art coating formulation. Note the improvement in tack-free time of Runs A, B, and C as compared to D and also the superior elongation of A, B, and C as compared to D. Run E illustrates that just the addition of allyl groups (tetra allyl oxyethane) to a prior art formulation does not accelerate drying. The coating of Run E had an excessively long tack-free time and was also soft. The allyl groups must be incorporated into the polymer network as in Runs A, B, and C in order to facilitate fast curing.

Tack-free time is measured according to the method outlined in U.S. Pat. No. 2,406,989. The Pencil hardness test was explained in the *Official Digest Federation of Paint and Varnish Production Clubs*, 28, 232 (March, 1956). The tensile strength is determined according to ASTM–D–412. The Taber Wear Factor is determined according to ASTM D–1044. The Impact Resistance is determined by the Gardner method.

| Run No. | A | B | C | D | E |
|---|---|---|---|---|---|
| Formulation, pbw. | | | | | |
| Propylene oxide adduct of glycerine-260 molecular weight | 10.2 | 10.4 | 10.3 | 9.9 | 7.7 |
| Glycerine-glyoxal condensate | 1.25 | — | — | — | — |
| Glycerine-glyoxal-allyl alcohol condensate | — | 1.48 | — | — | — |
| 1,2,6-Hexanetriol-glyoxal-allyl alcohol condensate | — | — | 1.84 | — | — |
| Trimethylolpropane | — | — | — | 0.84 | 0.88 |
| Tetrallyloxyethane | — | — | — | — | 9.8 |
| Polypropylene glycol-2000 molecular weight | 12.5 | 12.7 | 12.6 | 12.5 | 17.4 |
| Di-t-butyl p-cresol | 0.04 | 0.04 | 0.04 | 0.02 | 0.04 |
| Dibutyltin dilaurate | 0.04 | 0.04 | 0.04 | 0.02 | 0.04 |
| Toluene diisocyanate | 17.9 | 17.4 | 17.3 | 18.8 | 16 |
| Xylene | 29 | 29 | 29 | 29 | 24.1 |
| 2-Ethoxyethylacetate | 29 | 29 | 29 | 29 | 24.1 |
| Isocyanate to hydroxyl ratio | 1.5 | 1.5 | 1.5 | 1.5 | 1.5 |
| Film properties | | | | | |
| Tack-free time, (min.)* | 10–15 | 10–15 | 5 | 30 | 3–4 hr |
| Pencil hardness | 2H | 2H–3H | H–2H | 2H | F–H |
| Impact resistance, in. lb. | | | | | |
| Forward | Pass 160 | Pass 160 | Pass 160 | Pass 160 | Pass 160 |
| Reverse | Pass 160 | Pass 160 | Pass 160 | Pass 160 | Pass 160 |
| Tensile, psi. | 3400 | 3960 | 3860 | 4500 | 2500 |
| Elongation, % | 110 | 115 | 120 | 60 | 118 |
| Taber Wear Factor, CS-10, 1000 g., 1000 cycles, mgm. loss | 38.9 | 37.8 | 33 | 38.8 | — |

*4 mil wet film thickness

I claim:
1. In a urethane coating composition made by reacting an isocyanate with conventional polyols the improvement which comprises
    using an additional polyol made by the condensation reaction, with removal of water, of glyoxal and a polyhydric alcohol wherein the additional polyol contains at least two hydroxyl groups available for the urethane reaction.

2. A coating composition according to claim 1 wherein the isocyanate is toluene diisocyanate.

3. In a urethane coating composition made by reacting an isocyanate with conventional polyols the improvement which comprises
    using an additional polyol made by the condensation reaction, in the presence of an acid ion exchange resin, with removal of water, of glyoxal, a polyhydric alcohol, and a monofunctional allylic alcohol wherein the additional polyol contains at least an average of 0.5 hydroxyl groups available for the urethane reaction.

4. A coating composition according to claim 3 wherein the isocyanate is toluene diisocyanate and the monofunctional allylic alcohol is allyl alcohol.

5. In a urethane coating composition made by reacting an isocyanate with conventional polyols the improvement which comprises
    using an additional polyol made by the condensation reaction, in the presence of an acid ion exchange resin, with removal of water, of glyoxal, a polyhydric alcohol, and a monofunctional vinyl carboxylic acid wherein the additional polyol contains at least an average of 0.5 hydroxyl groups available for the urethane reaction.

6. A method for preparing a polyurethane surface coating which comprises
    1. mixing and reacting, in the presence of an inert solvent, an excess of isocyanate with a mixture of a conventional polyol, and an additional polyol having at least two hydroxyl groups available for the urethane reaction and prepared by
        a. mixing and reacting in a condensation reaction glyoxal and a polyhydric alcohol in the presence of a solvent;
        b. removing water from said reaction; and
        c. recovering said additional polyol from the reaction mixture;
    2. applying said isocyanate reaction product to a surface; and
    3. curing said polyurethane coating by allowing the excess isocyanate to react with moisture in air.

7. A method according to claim 6 wherein the isocyanate is toluene diisocyanate.

8. A method for preparing a polyurethane surface coating which comprises
    1. mixing and reacting, in the presence of an inert solvent, an excess of isocyanate with a mixture of a conventional polyol and an additional polyol having at least an average of 0.5 hydroxyl groups available for the urethane reaction and prepared by
        a. mixing and reacting in a condensation reaction glyoxal, a polyhydric alcohol and a monofunctional allylic alcohol in the presence of a solvent and an acid ion exchange resin;
        b. refluxing said reaction mixture and removing water from said reaction; and
        c. recovering said additional polyol from the reaction mixture;
    2. applying said isocyanate reaction product to a surface; and
    3. covering said polyurethane coating by allowing the excess isocyanate to react with moisture in air.

9. A method according to claim 8 wherein the isocyanate is toluene diisocyanate and the monofunctional allylic alcohol is allyl alcohol.

10. A method for preparing a polyurethane surface coating which comprises
    1. mixing and reacting, in the presence of an inert solvent, an excess of isocyanate with a mixture of a conventional polyol and an additional polyol having at least an average of 0.5 hydroxyl groups available for the urethane reaction and prepared by
        a. mixing and reacting in a condensation reaction glyoxal, a polyhydric alcohol and a monofunctional vinyl carboxylic acid in the presence of a solvent and an acid ion exchange resin;
        b. refluxing said reaction mixture and removing water from said reaction; and c. recovering said additional polyol from the reaction mixture;
2. applying said isocyanate reaction product to a surface; and
3. covering said polyurethane coating by allowing the excess isocyanate to react with moisture in air.

* * * * *